United States Patent [19]

Higa

[11] Patent Number: 4,771,572
[45] Date of Patent: Sep. 20, 1988

[54] METHOD AND APPARATUS FOR CULTURING PLANTS

[75] Inventor: Teruo Higa, Ginowan, Japan

[73] Assignees: Saken, Co., Ltd., Fukuoka; Ryoko Co., Ltd., Tokyo, both of Japan

[21] Appl. No.: 863,563

[22] Filed: May 15, 1986

[30] Foreign Application Priority Data

Sep. 12, 1985 [JP] Japan ............................ 60-202280

[51] Int. Cl.⁴ .................... A01B 79/02; A01G 25/06
[52] U.S. Cl. .......................................... 47/58; 47/48.5; 47/DIG. 10
[58] Field of Search ................ 47/48.5, 62, 63, 18, 47/79, DIG. 10, 65, 14, 19, 33, 58; 405/36

[56] References Cited

U.S. PATENT DOCUMENTS

| | | | |
|---|---|---|---|
| 728,088 | 5/1903 | Dillon | 47/48.5 X |
| 1,876,888 | 9/1932 | Ferguson | 47/48.5 |
| 2,545,717 | 3/1951 | Voigt | 47/18 |
| 3,309,875 | 3/1967 | Niederwemmer | 47/48.5 X |
| 3,518,831 | 7/1970 | Tibbals et al. | 47/48.5 X |
| 3,603,034 | 9/1971 | Stewart | 47/79 |
| 3,757,469 | 9/1973 | Smith et al. | 47/48.5 |
| 3,946,762 | 3/1976 | Green | 47/48.5 X |
| 3,990,181 | 11/1976 | do Valle | 47/48.5 X |
| 4,117,685 | 10/1978 | Skaife | 47/48.5 X |
| 4,142,325 | 3/1979 | Greenbaum | 47/79 |
| 4,188,154 | 2/1980 | Izatt | 47/48.5 X |
| 4,235,561 | 11/1980 | Peterson | 47/48.5 X |
| 4,267,993 | 5/1981 | Cunningham | 47/62 X |
| 4,572,706 | 2/1986 | Tsuruta | 47/48.5 X |

FOREIGN PATENT DOCUMENTS

| | | | |
|---|---|---|---|
| 1960937 | 6/1971 | Fed. Rep. of Germany | 47/DIG. 10 |
| 2645995 | 11/1977 | Fed. Rep. of Germany | 47/48.5 |
| 1182928 | 7/1959 | France | 47/DIG. 10 |
| 7410419 | 2/1976 | Netherlands | 47/48.5 |
| 652000 | 4/1951 | United Kingdom | 47/DIG. 10 |
| 881190 | 11/1981 | U.S.S.R. | 47/48.5 |
| 1028280 | 7/1983 | U.S.S.R. | 47/48.5 |

Primary Examiner—Robert A. Hafer
Assistant Examiner—Danton D. DeMille
Attorney, Agent, or Firm—Kenyon & Kenyon

[57] ABSTRACT

Improved method and apparatus for plant culture, particularly in arid regions. A culture bed is defined by moisture-proof walls and is charged with soil. Pipes disposed at the bottom of the culture bed supply moisture to plants growing therein, the amount of moisture being controlled to maintain the upper boundary of the capillary penetration zone a distance below the soil surface.

4 Claims, 4 Drawing Sheets

METHOD AND APPARATUS FOR CULTURING PLANTS

BACKGROUND OF THE INVENTION

The present invention is directed to the field of culturing plants, and more particularly to the field of culturing plants in arid environments.

A major obstacle in the path of increasing the world's food supply is the transformation of arid regions into areas suitable for agriculture. Effective development of such regions depends upon the solution to four problems. First, an adequate, dependable water supply must be assured. Although deep wells and desalinization have ameliorated this problem, these methods are expensive, and steps must be taken to utilize what water becomes available at the maximum possible efficiency.

Second, evaporation of available water must be minimized. Arid climates by definition include the elements conducive to rapid evaporation of whatever water is provided. Methods that depend upon irrigation canals, for example, allow an appreciable portion of the water to be evaporated before it can be put to use.

Third, wind damage must be prevented. Arid areas are characterized by the prevalence of strong winds. Not only do such winds increase the hazards of evaporation discussed previously, but also they can cause physical damage to the plants, particularly in early stages of growth.

Fourth, the accumulation of salts in the soil must be controlled. Regardless of the method used to control evaporation, that process will proceed at a higher rate than in temperate zones. Therefore, salts will tend to build up in the soil at a more rapid rate that would be found in other environmental conditions, with the result that the soil can rapidly become unsuitable to agriculture.

The prior art generally has failed to address the last three problems in any effective manner. Irrigation systems now in general use include not only canal-based systems, but also central-pivot systems in which irrigation pipes are rotated in circular patterns around a source pipe, and drip systems in which lines of irrigation piping supply water at a slow rate to plant areas. Inasmuch as all of these systems supply water at the surface level, the problems of evaporation and salt accumulation clearly are not dealt with. Further, application of water to the ground surface causes the soil to become soft, weakening the plants' ability to withstand wind forces.

Therefore, a clear need exists to provide improved methods and apparatus for plant culture in arid environments.

SUMMARY OF THE INVENTION

It is therefore an object of this invention to provide a method for plant culture in an arid environment.

A further object of this invention is to provide apparatus for culturing plants in an arid environment.

Another object of the present invention is to provide a method for culturing plants in an arid environment that reduces the amount of evaporation experienced by present systems.

A yet further object of the invention is to provide a method for improving or reclaiming desert soils.

Yet another object of the present invention is to provide a method for culturing plants in an arid environment that prevents accumulation of salts in the soil, allowing a given area to be suitable for agriculture for an extended period of time.

Still another object of the present invention is to provide a method for culturing plants in an arid environment that increases the ability of the plants to withstand wind damage.

These and other objects are accomplished by the present invention. The method generally includes the provision of a culture bed including side walls and a bottom wall, which may be constituted of a plastic material, such as polyethylene. The culture bed is filled with soil, which may be of a pebbly or sandy nature. Pipe means are buried in the soil, at a depth dependent upon the crop to be grown, and provided with means for permitting a slow flow of moisture, such as sections of a mesh-like material incorporated in sections of the pipe, or holes formed in the pipe walls. Means for restraining root growth, such as a sheet of non-woven fabric, may be provided, again dependent upon whether crops having extensive root systems, e.g., trees, are contemplated.

Seeds are planted in the culture bed, and water is introduced to the bed through the pipe means. Moisture penetrates the culture bed by capillary action, and sufficient water should be provided so that the moisture level penetrates the entire culture bed up to the ground level. This level should be maintained until the seeds germinate, and thereafter the moisture level should be controlled such that the capillary penetration zone is maintained at a level below the ground surface.

Salt accumulation is prevented by leaching the culture bed, preferably between crop-growing seasons. Leaching can be accomplished by introducing water containing a desalting compound, for example an acrylic amide polymeric flocculant. A preferable method is to introduce water containing this material at the ground surface, pumping same out through the pipe means. Such water can be reused for irrigation purposes after appropriate purification. Alternatively, water containing the desalting compound can be introduced through the pipe, with subsequent capillary action causing concentration of the salts at the ground surface, which then can be removed by conventional scraping means, and then replaced.

In accordance with this invention, soils are improved to facilitate the prevention and elimination of salt accumulation, permitting their cultivation for long periods of time.

The method and apparatus of the present invention solve the problems facing arid land reclamation by ensuring that all available water is used at optimum efficiency. Because exposure of the water to the atmosphere is at a minimum, evaporation is maintained at the lowest possible rate. Moisture is provided to the root structure, but the soil at the surface level remains dry, assisting the plants in resisting wind pressure. Accumulation of salts is maintained at a low level by the bottom and side walls of the culture bed, as salts from surrounding soil cannot enter the culture bed, and whatever salts do accumulate are removed through the leaching step. Thus, the present invention provides an improved method for developing arid areas of the earth for agriculture.

DETAILED DESCRIPTION OF PREFERRED EMBODIMENTS

Figure 1:
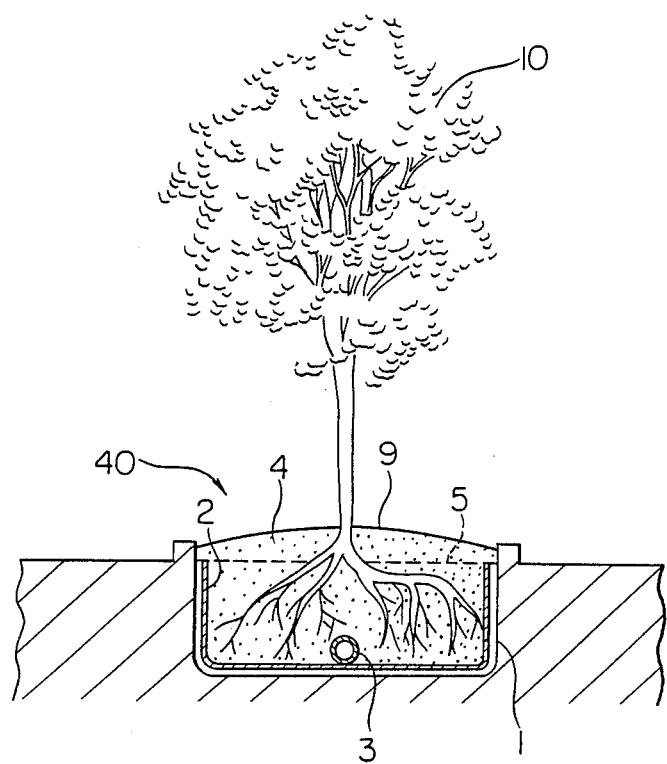
FIGS. 1(a)–(b) are cross-sectional views of an embodiment of the invention.
Figure 1B:
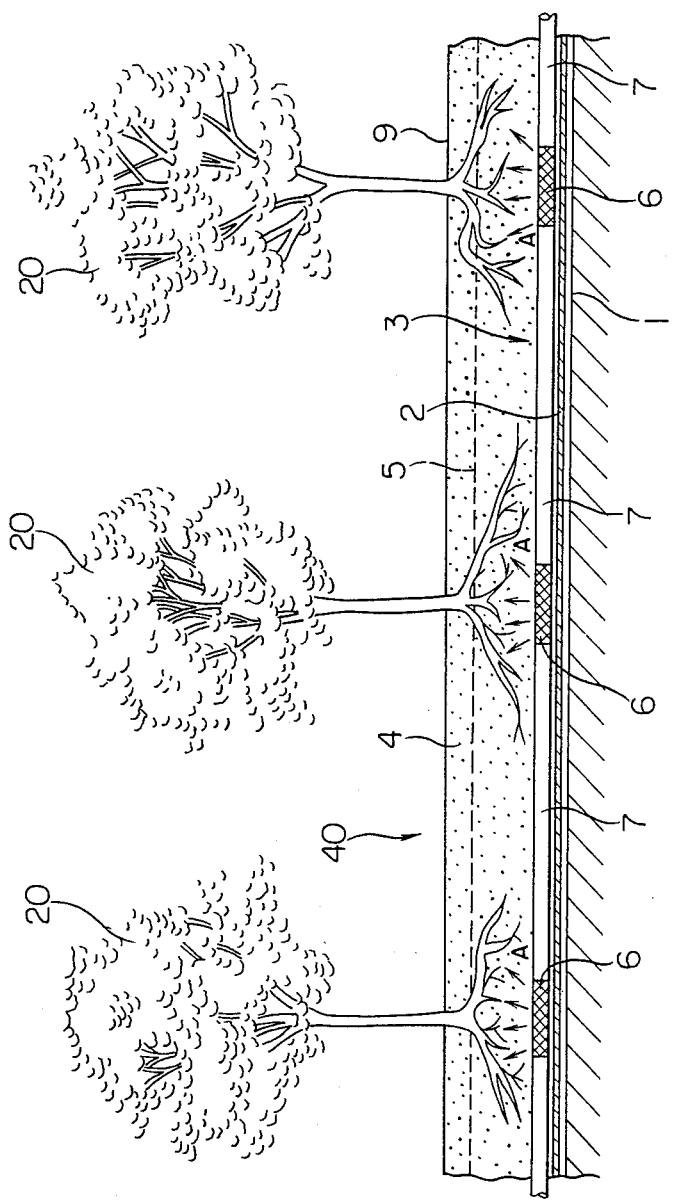

An embodiment of the present invention is shown in FIGS. 1(a) and (b). The embodiments of FIGS. 1(a) and (b) are particularly adapted to an urban environment, more particularly to an arid urban environment, wherein it is necessary to supply water to trees 10 or shrubs 20.

As can be seen in FIGS. 1(a) and (b), a culture bed 40 is formed in the surrounding earth, isolated from same by a wall 1. This wall can be any convenient waterproof material, such as a plastic sheet of polyethylene, polypropylene or polyvinyl chloride, of sufficient thickness to withstand handling and maintain a water barrier between the culture bed and the surrounding earth. Alternatively, the wall could be constructed of concrete, asphalt or similar material. The culture bed is filled with soil 4, which may be topsoil, if available, or may be sandy or pebbly soil, as discussed below.

If the plants to be contained in the culture bed are characterized by extensive and expanding root systems, it will be advantageous to provide for containing those root systems, as by reinforcing layer 2, which may be a sheet of nonwoven fabric disposed inside the moisture barrier. Typical dimensions for a culture bed for growing trees, as in FIG. 1, are about 3 meters in width and about 1.5 meters in depth, and for smaller plants such as vegetables, the bed shall be about 0.7 meters width and about 0.6-1 meters depth.

Water is provided through pipe means. Preferably, the pipe 3 is laid in the bottom of the culture bed. This pipe may be any convenient pipe known to the art, such as a vinyl chloride pipe 7. Means for allowing moisture to seep through the pipe to the culture bed may be provided by linking sections of vinyl chloride pipe with sections of a mesh-like pipe 6 or by providing sections of the vinyl chloride pipe with areas having small perforations through the pipe walls.

In operation, seeds are planted in the culture bed at an appropriate depth, and water is introduced into pipe 3. Moisture passes through either mesh-like pipe section 6 or perforations and into the cultivated soil 4. Capillary action causes the moisture to penetrate the soil in an upward direction, shown by arrows A, to form a capillary penetration zone having an upper boundary 5. Those in the art will appreciate that it has proved advantageous to provide sufficient water so that the capillary penetration zone extends to the ground surface 9 during the period of seed germination. After germination, the water supply should be reduced so that the capillary penetration zone boundary recedes from the surface a distance of about 10-20 cm, depending upon the crop involved. During the remainder of the growing cycle, the capillary penetration zone upper boundary should be maintained at this level, using techniques known in the art.

Providing water from the bottom of the culture bed, coupled with maintaining the ground surface 9 in a dry state, produces several important advantages. First, the moisture is never directly exposed to the atmosphere. Thus, the combined effects of strong sunlight, high winds and low relative humidity cannot act directly upon the moisture supply to produce evaporation. Also, the dry layer of soil between the capillary penetration zone upper boundary and the ground surface serves to assist the plant in growing sturdy to resist lateral forces imposed by wind, thus minimizing wind damage. In this manner, several of the important disadvantages of the piror art are overcome.

Figure 2:
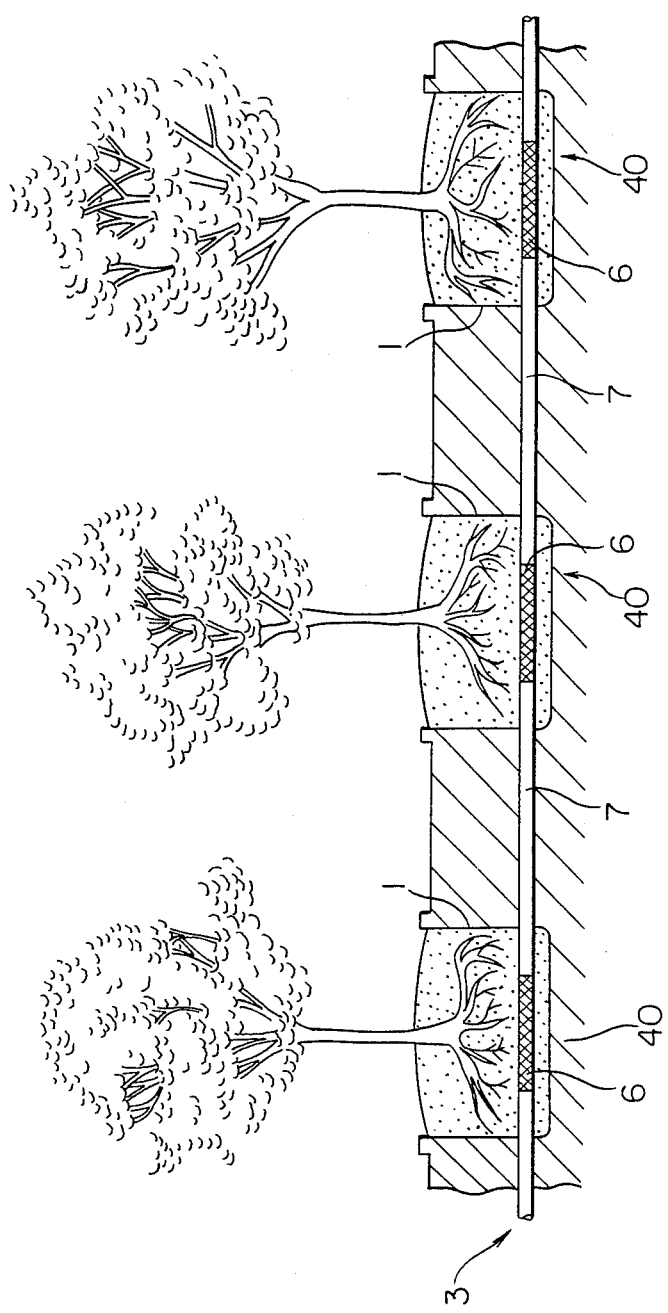
FIG. 2 is a further embodiment of the invention, adapted to spot planting.
Figure 3:
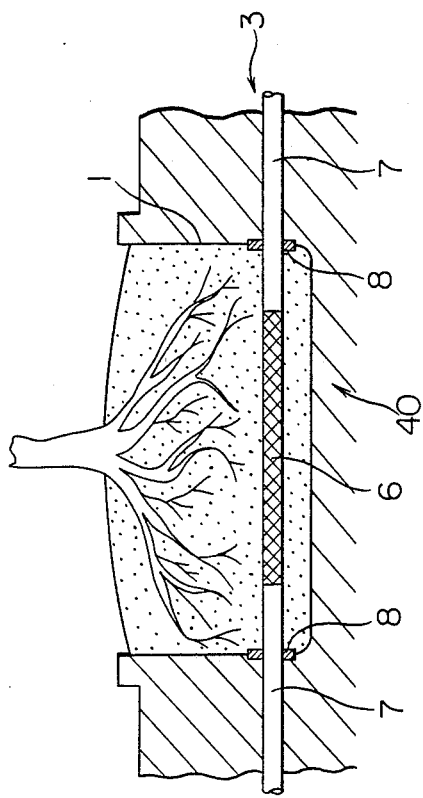
FIG. 3 is a cross sectional view of one of the spot planting zones shown in FIG. 2.

Further advantages can be accrued through spot planting, as shown in FIGS. 2 and 3. As seen there, rather than the culture bed forming a continuous, linear trench, separate culture beds 40 are provided for each plant. The construction of each culture bed proceeds identically to that described above, except that the culture beds are formed in the nature of pits rather than trenches.

Moisture is again provided through pipe 3, with a section of mesh-like pipe 6 disposed within the culture bed. Seals 8, formed of any convenient and suitable plastic or sealing material known to the art, may be provided to ensure a secure moisture barrier at points where the pipe passes through the wall 1. Alternatively, a perforated section of pipe may replace the mesh-like pipe, as discussed above. Operation of this embodiment proceeds identically to that discussed above, except that only the soil area immediately adjacent each plant receives moisture. Clearly, this embodiment reduces losses through evaporation even beyond those experienced with the linear culture bed system discussed above.

Even though the present invention provides for greatly reduced evaporation losses, the nature of an arid environment makes an increase in salt concentration of the culture soil highly likely, especially in harsh desert environments. The present invention deals with this problem in two ways. First, salts from the soil surrounding the culture bed are prevented from entering the culture bed by the moisture barrier. Second, a method is provided for periodically leaching the salts from the culture bed. This operation preferably is accomplished between growing cycles, but in the case of lawns, shrubs, and trees, the process can be carried on in the presence of the plants.

In this invention, the water content is controlled by using pipes laid at the bottom such that water is supplied or drained depending on whether the water content is insufficient or excess, in which the timing for the supplying/draining is determined in accordance with the water content in the soil. The most efficient system for water detection is to bury water content sensors about 5-10 cm above the position or level of the pipes and to actuate a pump for supplying/draining water based on the water content. In this invention, water in the culture bed is supplied from the bottom and rises by means of the capillary phenomenon, the thickness of the capillary layer being about from 30 to 40 cm. Therefore, it is sufficient to dispose one or few water sensors within that zone. The water sensor may be a thermocouple or a plaster-block type, known to the art.

A simpler method for detecting water content is by visually judging the water content accumulated in a transparent pipe embedded at the corner of the culture bed.

Alternatively, a pipe may similarly be buried at the corner of the culture bed so that the level of a float placed therein is detected visually, optically or by a mechanical contact. The water supplying/draining pump may be actuated in the same manner as described above.

Figure 4B:
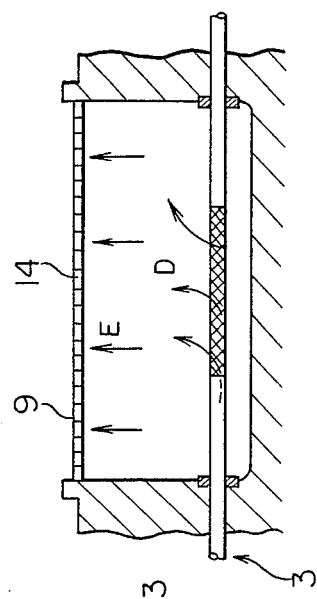
FIGS. 4(a)-(b) are cross-sectional views depicting the leaching process
Figure 4A:
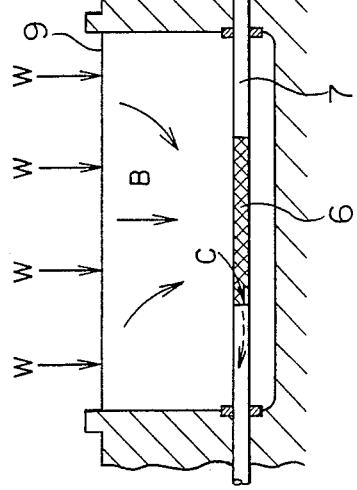

As shown in FIG. 4(a), the leaching process begins by applying a desalting solution W to the ground surface 9. This solution preferably includes an acrylic amide polymeric flocculant, incorporated at a concentration of about 1000 ppm in water, and is applied preferably as a single treatment. In cases of severe salt build-up, however, several applications of the desalting solution may be required. The desalting solution is applied directly to the ground surface and penetrates downward by capillary action as shown by arrows B. At this point, the pumping mechanisms (not shown) attached to the pipe 3 are operated in reverse direction so that the solution is drawn into the pipe as shown by arrow C. The water thus recovered can be purified, using means such as reverse osmotic membrane purification and later reused for irrigation purposes.

An alternative method for leaching is illustrated in FIG. 4(b). There, the desalting solution is introduced into the pipe 3 and proceeds to penetrate the culture bed as shown by arrows D and E. The solution is provided in sufficient volume so that the upper boundary of the capillary penetration zone reaches the ground surface 9. The action of the desalting agent is such that this process results in the salt being concentrated in a concentration zone 14 at the ground surface. This concentration zone can be removed, preferably by scraping, and additional soil added over the culture bed. Clearly, this latter method would not be suitable for permanent plants, such as grasses, trees, and shrubs.

Leaching is preferably carried out once per year, most preferably in the winter. The water so utilized can be reused by passing same through a reverse osmotic membrane. According to this invention, the water required for leaching can be reduced to about 10% of that required conventionally, owing to the presence of wall 1.

The present invention leads to significant advances over the results achieved by the prior art. First, because the moisture is distributed efficiently and evaporation losses are controlled, the water required for irrigating a given crop area can be reduced to less than 30% (and as low as 10%) of that required by conventional sprinkler systems. Second, the control of salt accumulation allows the same area to be used over a long period of time, rather than requiring the abandonment of some growing areas as the salt concentration increases. Compared to techniques used by the prior art for leaching salts from irrigated areas, the present invention offers the possibility of recovering and reusing the water, adding to the efficiency of the method. Furthermore, the present invention offers the opportunity to increase the soil quality through the addition of organic material, fertilizers, etc., whereas the prior art found little opportunity to exercise this option in that such materials quickly would be leached away. Here, the provision of the moisture barrier will retain soil additives within the culture bed, leading quickly to improved crop yields. In addition the area of constant moisture below and around the plant root systems will allow for the development of a healthy level of microorganism activity within the culture bed.

The present invention permits yield increases of up to 50% compared to present culture methods. Concomitantly, fertilizer requirements are decreased by 30-50%. Virtually any type of crops can be cultivated employing the present invention, including wheat, rice, sugar cane, maize, beans, melons, strawberries, foliar vegetables, tomatoes, eggplants, potatoes, flowers, fruit trees, or other vegetables. Advantageously, no special adaptations are necessary when changing between most conventional food crops. Also, the method can be adapted to any scale of cultivation.

The culturing method of this invention requires no particular application of organic fertilizers and enables non-plowing culture. Also, the invention does not require that the culture bed be composed of sand nor that a cover be provided for the surface of the culture soils, as with a sheet. Power cost for supplying water is extremely low. Plant yields by this invention are about 1.5-1.8 times as high as that of the center-pivot system. Also, this invention can be applied satisfactorily in the case of culturing plants on the field of 100 hectares or larger.

EXAMPLE 1

A planting box of 90 cm width, 50 cm height and 10 m length made of concrete was disposed in a greenhouse. Perforated pipes were laid along the longitudinal direction at the bottom of the box and sand was filled to a 35 cm height to form a culture bed. The perforated pipe was extended with a slight slope and both ends thereof were projected from the planting box, with the upstream end being connected with a water supply device and the downstream end being disposed with a draining device.

Seedlings of tomato plants were planted in the culture bed and grown for about 5 months. A plasterblock type water sensor was inserted at a position about 10 cm height from the pipe for the detection of water content. If the water content was insufficient, water was supplied from the supply device through the pipe.

The amounts of tomatoes harvested, fertilizer applied and water supplied were as follows, converted into amounts that would have been experienced for cultivating a 1 hectare plot.

Tomato harvested: about 170 tons
Amount of fertilizer applied: 200 Kg for each nitrogen, phosphorous and potassium component
Water supplied: 600 mm, converted as rain fall When compared with the method of supplying water from the ground surface in a conventional cultivation bed with no bottom, it could be confirmed that the harvest was increased about 1.7 times and, conversely, the amount of water supplied was decreased by about one-half. Further, microorganisms such as photosynthetic bacterium and actinomycetes were incorporated in the sand just after the planting of the tomato seedlings by pouring an aqueous solution of microorganisms around the seedlings of tomato in this Example. The microorganisms were stable during the course of the experiment, these microorganisms being one cause of the increased harvest. Furthermore, although the dripping method employed in dry soils can save water to the same level as that of this invention because the water is applied only locally on the ground surface in that method, no stable growing or living conditions can be expected for microorganisms in the ground, and transplantation is troublesome because the work has to be done through the gaps between dripping positions.

EXAMPLE 2

Leaching was conducted in the culture bed described in connection with Example 1 after harvesting the tomato plants. First, an aqueous solution diluted to a level of 1 part per 10,000 of an acrylamide-type flocculant was prepared and poured to cover the surface of the culture bed. The aqueous solution was drained through the pipe by using a pump of 20 liters/min delivery power and then poured again over the surface.

The electroconductivity of the sand was measured before circulation by first mixing the sand with tap water, at a ratio of 1:4 (sand:water); electroconductivity of the mixture was found to be 3 mmv. This level decreased to 1 mmv after the circulation of 24 hours. The electroconductivity of the tap water used for the measurement was 0.06 mmv.

Next, a fresh or new aqueous solution (also diluted to 1 part in 10,000) of the acrylamide polymer flocculant was prepared again and the electroconductivity was measured while circulating the solution in the same manner. It was found that the electroconductivity was decreased to 0.2 mmv, showing that removal of the salt was almost ideally achieved.

It is generally considered that salt damage occurs if the electroconductivity of the ground exceeds 1 mmv, and leaching is required in such cases. Leaching, while varying depending on the salt concentration in the water to be supplied, is considered necessary once per 3 to 4 years for 500 to 1,000 ppm salt levels and once per year for 3,000 ppm.

Because the culture bed of this invention is used, a high leaching effect can be obtained and about an ideal salt removal can be achieved by preparing an aqueous solution of a polymeric flocculant and circulating the solution about for 48 hours, repeating the operation once. Thus, as compared with conventional leaching of cultivation soils, the amount of the aqueous flocculant solution used and the circulation time can significantly be reduced.

Those in the art will appreciate that variations and adaptations of the embodiments disclosed herein are possible without departing from the spirit of the present invention. For example, the culture beds may be constructed in a variety of shapes, as may be best suited to individual topography. These and other variations may be made within the scope of this invention, which is defined solely by the claims appended hereto.

I claim:

1. A method for culturing plants, comprising the steps of:
   providing a culture bed having means for containing moisture and being filled with soil;
   planting said plants in said soil;
   introducing moisture into said culture bed through pipe means buried in said culture bed;
   controlling the level of capillary penetration of said moisture such that said moisture penetrates the entirety of said culture bed prior to germination of said plants and penetrates a preselected distance below ground level subsequent to germination of said plants; and
   leaching accumulated salts from said culture bed at predetermined intervals, including the steps of
   flowing a fluid containing a desalting compound and water through said pipe means into said culture bed, in a quantity sufficient to form a salt concentration zone at the surface of said soil; and
   removing said salt concentration zone.

2. The method of claim 1, wherein said plants are seedlings.

3. The method of claim 1, wherein said plants are planted as seeds.

4. The method of claim 1, wherein said leaching step further includes the step of:
   adding soil to said culture bed in an amount sufficient substantially to replace said soil removed in said removing step.

* * * * *